United States Patent [19]
Hiestand et al.

[11] 3,763,845
[45] Oct. 9, 1973

[54] WALL SAW ASSEMBLY
[75] Inventors: James C. Hiestand, Redondo Beach; Richard O. Thies, Studio City, both of Calif.
[73] Assignee: Continental Drilling Company, Los Angeles, Calif.
[22] Filed: Feb. 22, 1972
[21] Appl. No.: 227,924

[52] U.S. Cl. .............................................. 125/14
[51] Int. Cl. ............................................ B28d 1/04
[58] Field of Search ..... 125/12–14; 143/47 B, 47 D; 51/241 S

[56] References Cited
UNITED STATES PATENTS

| | | | |
|---|---|---|---|
| 2,921,492 | 1/1960 | Worth | 143/47 B |
| 3,396,713 | 8/1968 | Schuran | 125/14 |
| 3,378,307 | 4/1968 | Dempsey | 125/14 X |
| 1,772,818 | 8/1930 | Savage | 125/14 |
| 2,037,283 | 4/1936 | Strachan | 143/47 D |
| 2,079,864 | 5/1937 | Lansing | 125/14 |
| 3,323,507 | 6/1967 | Schuman | 125/14 |
| 2,454,992 | 11/1948 | Coleman | 51/241 S |
| 2,736,311 | 2/1956 | Coates | 125/14 |

*Primary Examiner*—Harold D. Whitehead
*Attorney*—Billy A. Robbins et al.

[57] ABSTRACT

A saw assembly for cutting walls and other flat concrete surfaces is disclosed. The saw assembly is removably mounted on a trolley which rides on a track structure attached to the flat surface by means of mounting brackets. The trolley contains wheels which support the saw on the track. Certain of the wheels are retractable for transversely mounting or removing the saw from the track. A continuous opening in the track allows the mounting brackets to be secured to the track at any point along the length thereof. Further, the mounting brackets are laterally adjustable after they are secured to the flat surface so as to provide a fine adjustment in alignment of the saw to the desired cut.

7 Claims, 6 Drawing Figures

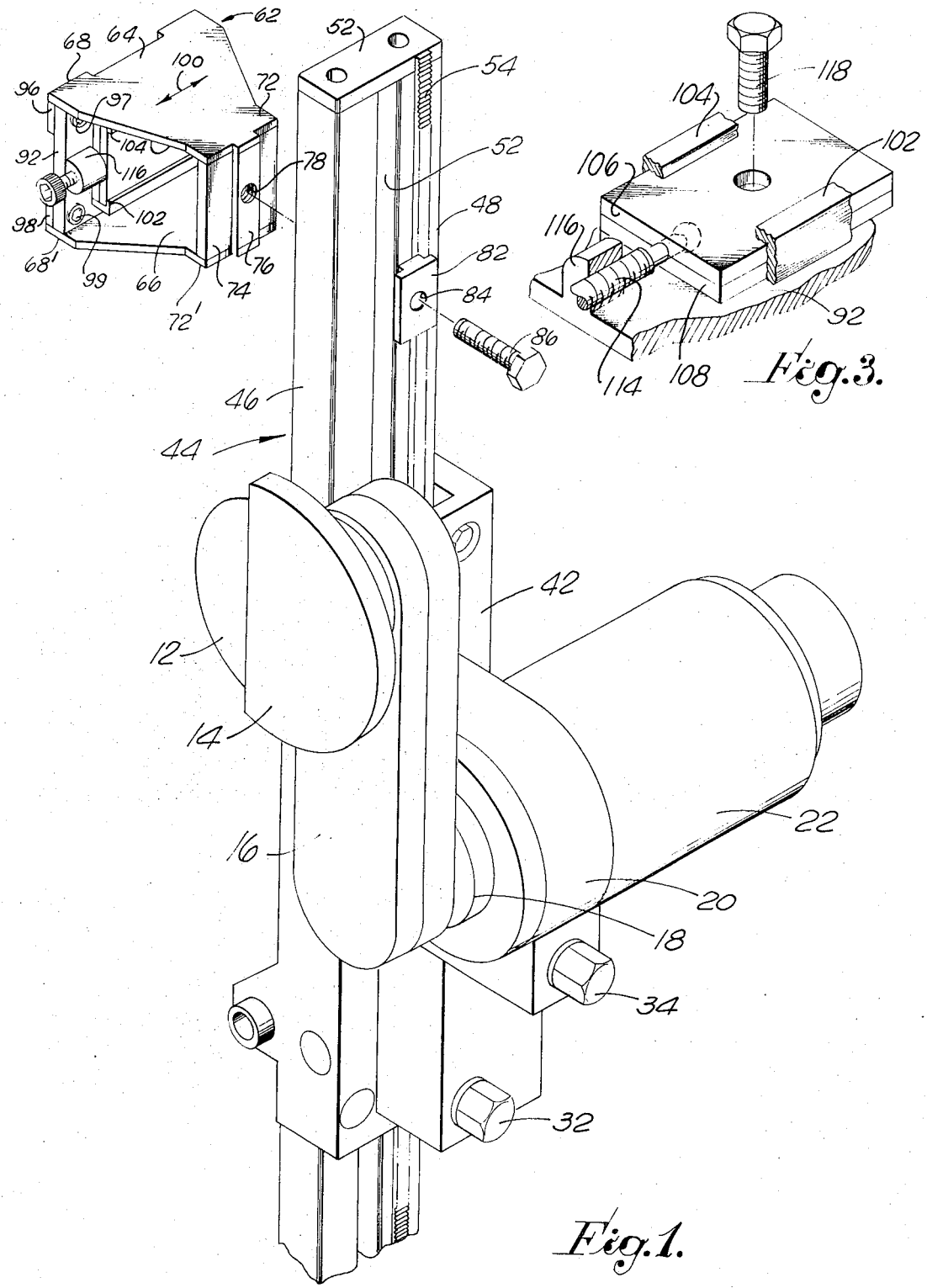

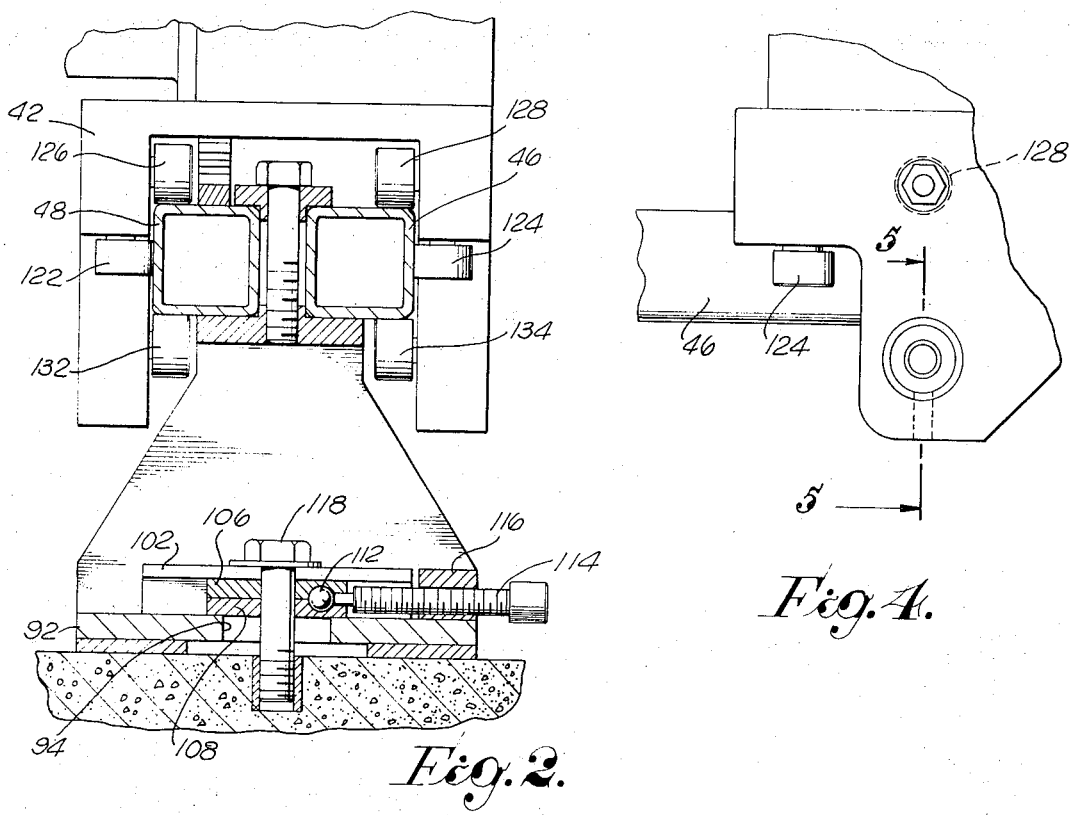
Fig. 4.
Fig. 2.
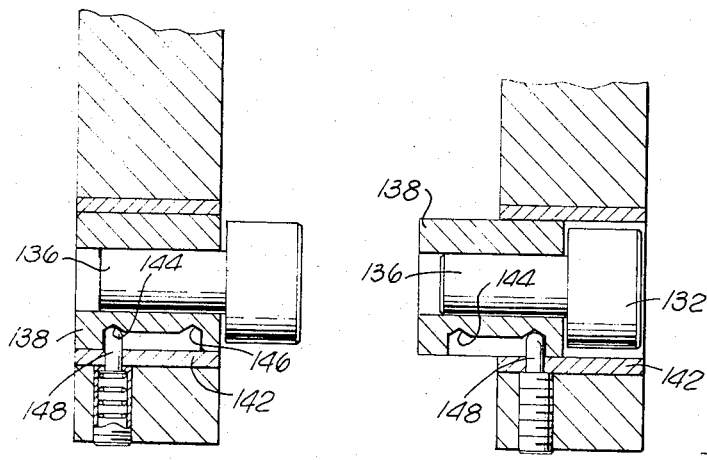
Fig. 5a.
Fig. 5b.

WALL SAW ASSEMBLY

BACKGROUND OF THE INVENTION

1. Field of Invention

The invention relates to the field of concrete cutting saws, and more particularly, relates to saws which follow a fixed guide attached to the surface to be cut, and which may be adjusted with respect thereto.

2. Description of the Prior Art

The best prior art known is found in U.S. Pat. Nos. 2,488,643; 2,502,043; 2,592,001; 3,011,530; 3,148,001; and 3,378,307 and in U.S. Pat. application Ser. No. 132,387 filed Apr. 8, 1971. In U. S. Pat. application Ser. No. 132,387, filed Apr. 8, 1971, and assigned to the assignee of the present application, there is described a saw for cutting openings in concrete walls and other similar flat surfaces. The saw is mounted on a trolley which rides on a track, attached to the flat surface, and is moved along the track by means of a gear-driving device. The saw blade is mounted at one end of an arm. The arm is pivotable about its other end, which is attached to a cylindrical housing formed around the output shaft of a motor. When the housing is rotated, the end of the arm holding the sawblade is moved up and down for adjustment of the depth of the cut. Such a saw works exceedingly well in most application but does have some disadvantages under certain circumstances.

In the saw of the type described in the aforementioned patent application, the saw and trolley are positioned on a track by feeding the trolley from one end of the track. Normally such a procedure requires that the saw and trolley be held by two persons and the gearing between the saw and the track be adjusted until the trolley is correctly positioned on the track. Those application where the end of the track is near a wall, ceiling, or floor, it may be difficult to thread the saw onto the track. Moreover, in some applications using prior art saws, the desired positioning of the track-supporting brackets is precluded by obstacles on the surface to be cut. Under these circumstances, the operator must move the entire track to position the mounting brackets on the flat surface. Further, the holes for positioning the mounting bracket must be accurately located in the surface to be cut and upon which the saw is to be mounted for correctly aligning the saw blade for the cut to be made. If the holes are not accurately located, then the position of the saw is inaccurate and the resultant cut is not correctly positioned.

These disadvantages found in the prior art saws result in high costs through the numbers of operators required on a given job as well as the time required for set up of the saw. To overcome the attendant disadvantages of prior art saws of the type used for cutting openings in concrete walls and other similar flat surfaces, the present invention allows the saw to be placed on a track or removed therefrom by approaching the track transversely, and mounting the saw thereon rather than feeding the saw from an end onto the track. Moreover, the design of the track is such that it can be moved with respect to mounting brackets which are positioned on the flat surface. Thus, should obstacles be present on the surface where the bracket is to be mounted, these obstacles will not require that the mounting bracket and track be positioned in an undesirable place on the surface. Moreover, the position of the saw can be adjusted after it is mounted on the track so that the mounting bracket need not be accurately located on the surface, thus increasing the speed with which the operators may mount the bracket and the track on the surface.

SUMMARY OF THE INVENTION

The invention comprises a saw assembly for cutting openings in concrete walls and other similar flat surfaces. The saw assembly is removably mounted on a trolley which rides on a track structure attached to the flat surface. The trolley is supported on the track by means of wheels. Certain of the wheels may be retracted for mounting or removing the saw from the track structure. A continuous opening is formed along the length of the track structure to allow mounting brackets to be secured to the track structure at any point along the length thereof. The mounting brackets are used to secure the entire assembly to the flat surface and are laterally adjustable, after they are secured to the surface, to provide a fine adjustment of the saw position.

BRIEF DESCRIPTION OF THE DRAWINGS

FIG. 1 depicts a partially-exploded perspective view of the wall saw;

FIG. 2 illustrates a front view partly in section illustrating the mounting arrangement of the wall saw;

FIG. 3 depicts a partial perspective view of the adjustment mechanism in the mounting brackets shown in FIGS. 1 and 2;

FIG. 4 shows a side view of the mounting arrangement depicted in FIG. 2; and

FIG. 5a and FIG. 5b depict a sectional view of the securing arrangement of the saw to a track taken about the line 5—5 of FIG. 4.

DESCRIPTION OF THE PREFERRED EMBODIMENT

Referring now to the drawings, there is shown a wall saw of the type depicted in U. S. Patent Application Serial No. 132,387. The saw comprises a sawblade 12 which is partially covered by a guard member 14. The sawblade is attached by means of a spindle (not shown) to the end of an arm 16. The arm in turn is connected at one end to a circular housing 18 surrounded by an outer housing 20. Further, the saw assembly as described to this point is the type depicted in the aforementioned U. S. Pat. application.

The outer housing 20 of the saw assembly is secured to a movable trolley 42. The trolley in turn rides on a track structure 44 formed of a first and second square hollow track sections 46 and 48. The hollow track sections are secured together at their ends by a removably plate 52 which provides a gap 52 therebetween. The track section 48 contains rack teeth 54 thereon which are adapted to mesh with gear teeth on the saw assembly for driving the assembly along the length of the track structure.

To secure the track structure 44 to the surface which is to be cut, wall brackets 62 are utilized. The brackets 62 are generally formed of a pair of opposed plates 64 and 66. The enlarged ends 68—68' of the opposed plates normally abut the wall or surface to which the brackets are to be secured, as shown in FIG. 2. The reduced end 72—72' of the opposed plates are interconnected by a first end plate 74 having a centrally-protruding key 76 the width of which is equal to the gap 52 formed between the track sections 46 and 48. As is more clearly shown in FIG. 2, the key 76 is inserted into the gap 52 and defines a threaded opening 78.

The enlarged ends 68—68' of the opposed plates 64 – 66 are interconnected by a second end plate 92. As can be seen in FIG. 2, the second end plate 92 defines a central opening 94 therethrough. Further, the end plates 64 and 66 contain flanges 96 and 98, respectively, which are utilized to secure the opposed plates 64 and 66 to the end plate 92.

As will be understood by those skilled in the art, after forming appropriate openings in the wall surface, a pair of track-supporting brackets are attached by bolts 118. The track sections 46–48 are then placed in position on the keys 76 and longitudinally adjusted to the desired position. When thus positioned, a T-shaped bearing 82 defining an opening 84 is inserted into the gap 52.

The opening 84 receives a bolt 86 which in turn is threadably received by the opening 78 in the key 76 thereby to secure the track to the mounting bracket 62. Since the T-shaped bearing 82 may be inserted in the gap 52 at any point along the track structure 44, the track can be positioned as desired with respect to the bracket 62 so long as proper support for the same is provided. Thus, should there by any obstacles along the surface, the bracket can be positioned away from the obstacles and then the track positioned thereon. On prior art saws, the mounting brackets have a fixed position near opposite ends of the track. Moreover, as can be seen, a plurality of tracks can be ganged together with brackets 62 positioned at appropriate points along each of the gang sections of tracks. Leveling bolts 97 and 99 may be used to level the brackets if needed.

To allow for adjustment of the mounting bracket once the bracket is positioned in the surface which is to be cut by the saw, there is provided a lateral adjustment mechanism for the brackets. As shown in FIGS. 1, 2 and 3, a pair of L-shaped brackets 102 and 104 are secured to the inner surface of the second end plate 92. Slidably movable with respect to the L-shaped brackets 102 and 104 and secured therein for lateral movement only are a pair of plates 106 and 108. The plates 106 and 108 define opposed recesses which receive a ball 112 which is formed at the end of a threaded shaft 114 which is threadably received in a sleeve 116 affixed to plate 92. The bolt 118 is inserted through a central opening in the plates 106 and 108 into the opening in the surface to which the mounting bracket is to be inserted. Once the bolt 118 is secured to the surface, side adjustment in a lateral direction of the mounting bracket may be made by rotating the shaft 114. Rotation of the shaft 114 causes the mounting bracket to move in the directions shown by the double-headed arrow 100 in FIG. 1. Thus, the position of the bolt 118 in the surface need not be exact as required in the prior art since adjustment can be made by movement of the shaft 114 to accurately position the saw to cut along the desired line.

Referring once again to FIG. 2, the details of the attachment of the trolley 42 to the track structure 44 are shown. The trolley 42 is generally U-shaped in cross-section. The trolley contains a left side wheel 122 in one side wall and a right side wheel 124 in the other side wall, which abut the outer side walls of the tracks 48 and 46, respectively. The trolley further contains a left upper wheel 126 and a right upper wheel 128 which abut a top surface of the tracks 48 and 46, respectively.

Finally, the wheels 132 and 134 abut the bottom surface of the tracks 48 and 46, respectively. The positions referred to are as viewed in FIG. 2.

In order to rapidly position the trolley on the track, the wheels 132 and 134 are made retractable. The retractable wheel feature can be seen in FIG. 5a, wherein the wheel 132 contains a reduced diameter shaft 136 which is positioned within a slidable bushing 138 in a side wall of the trolley. Surrounding the outer surface of the slidable bushing 138 is a fixed bushing 142.

The slidable bushing 138 contains first and second detents 144 and 146 into which a keeper 148 may be adjustably positioned. When the keeper 148 is moved in a downward position in FIG. 5a, the wheel 132 may be moved toward the left into the trolley as shown in FIG. 5b, until the keeper 148 abuts the detent 146. Further, the wheel 134 may be moved into the trolley in a similar manner. Thus, as can be readily seen, the operator can approach the track and place or remove the trolley and saw on the track from a transverse position. Once the trolley is on the track, the wheels 132 and 134 may be moved in the position shown in FIGS. 2 and 5a, thus securing the trolley to the track.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

Moreover, while the device has been described for use with a saw assembly, it should be understood that the invention could be used with any device which must be mounted on a track or which must be accurately positioned on a surface.

What is claimed is:

1. A saw assembly comprising:
   a track structure for mounting on a surface to be cut and for guiding said saw;
   a movable trolley, means for supporting said trolley on said track structure comprising a first plurality of track-engaging means for retaining said trolley on said track structure druing travel of the trolley, a second plurality of retractable track-engaging means for mounting and removing said trolley structure transversely of said track structure, retaining means secured to said retractable track-engaging means for moving said retractable track-engaging means from a non-track-engaging position to a track-engaging position and retaining said retractable track-engaging means with said trolley when said retractable track-engaging means are in either of said positions; and
   a housing having a rotatable saw blade secured thereto; said housing being mounted on said trolley structure.

2. A saw assembly in accordance with claim 1 wherein detent means are provided for retaining said retractable means in one of said positions.

3. A saw assembly in accordance with claim 1 wherein said track structure includes a pair of spaced-apart track members positioned in parallel planes.

4. A saw assembly in accordance with claim 3 wherein said track members are spaced apart to form a continuous gap along at least a portion of said track, and bracket means mounted on said surface being positionable along said track structure in said gap.

5. A saw assembly in accordance with claim 1 wherein said track structure includes bracket means defining an opening therein for receiving securing means to fasten said track means for laterally positioning said track structure relative said surface after said bracket is secured thereto.

6. A saw assembly in accordance with claim 5 wherein said bracket means includes a base member and an end plate adapted for securing to a track, and said adjusting member moves said end plate relative said base member.

7. A saw assembly in accordance with claim 1 wherein said retaining means comprises a shaft member secured to each of said retractable track-engaging means, each of said shaft members being positioned within a slidable bushing in a side of said trolley, and a fixed bushing surrounding the outer surface of said slidable bushing.

* * * * *